US011215399B2

(12) United States Patent
Chen et al.

(10) Patent No.: US 11,215,399 B2
(45) Date of Patent: Jan. 4, 2022

(54) HIGH TEMPERATURE REACTION SYSTEM

(71) Applicant: NATIONAL CHENG KUNG UNIVERSITY, Tainan (TW)

(72) Inventors: In-Gann Chen, Tainan (TW); Shih-Hsien Liu, Kaohsiung (TW); Ke-Miao Lu, Kaohsiung (TW); Chia-Ming Yang, Tainan (TW); Hao-Hsun Chang, New Taipei (TW)

(73) Assignee: National Cheng Kung University, Tainan (TW)

( * ) Notice: Subject to any disclaimer, the term of this patent is extended or adjusted under 35 U.S.C. 154(b) by 243 days.

(21) Appl. No.: 16/705,593

(22) Filed: Dec. 6, 2019

(65) Prior Publication Data

US 2021/0170354 A1 Jun. 10, 2021

(51) Int. Cl.

*B01J 8/06* (2006.01)
*F27D 21/02* (2006.01)
*F27D 19/00* (2006.01)

(52) U.S. Cl.

CPC ...... *F27D 21/02* (2013.01); *F27D 2019/0015* (2013.01)

(58) Field of Classification Search

CPC ........ B01J 8/067; B01J 8/0285; B01J 8/0015; F27D 3/04; F27D 3/06; F27B 9/04; F27B 9/06; F27B 9/068; F27B 9/20
See application file for complete search history.

(56) References Cited

U.S. PATENT DOCUMENTS

2009/0197075 A1* 8/2009 Newton .............. C23C 16/4488 428/332
2012/0321544 A1* 12/2012 Takai ................... B01J 37/0217 423/447.3
2020/0234944 A1* 7/2020 Chou ................ H01L 21/02546

* cited by examiner

*Primary Examiner* — Nathaniel Herzfeld
(74) *Attorney, Agent, or Firm* — Michael Best & Friedrich LLP

(57) ABSTRACT

A high temperature reaction system includes a reaction tube including a heating space, a discharge unit, a cooling unit, a feeding unit and an observation and analysis unit. The discharge unit is disposed opposite to an inlet of the heating space and has a discharge space communicating the heating space, and an observation window and a discharge opening which communicate the discharge space. The cooling unit has a cooling space communicating the discharge opening. The feeding unit includes a carrier holding a sample, and a moving module for moving the carrier and the sample. The observation and analysis unit includes an image capture module and an analysis module for analyzing gas released by the sample.

10 Claims, 4 Drawing Sheets

HIGH TEMPERATURE REACTION SYSTEM

FIELD

The disclosure relates to a high temperature reaction system, and more particularly to a high temperature reaction system capable of an in situ analysis of a sample during heat treatment.

BACKGROUND

When a conventional high temperature reaction system is used for performing heat treatment to a sample, such as sintering or annealing, it takes time to increase or decrease the temperature of the sample inside the system. Moreover, no in situ analysis of the sample is performed during heating. In addition, because the sample cannot be instantaneously cooled, the reaction of the sample can undesirably continue after completion of heat treatment.

SUMMARY

Therefore, an aspect of the disclosure is to provide a high temperature reaction system that can alleviate the drawback of the prior art.

A high temperature reaction system according to the present disclosure is capable of performing an in situ analysis of a sample during heat treatment. The high temperature reaction system includes a reaction tube, a discharge unit, a cooling unit, a feeding unit and an observation and analysis unit.

The reaction tube includes a heating space having a heating portion, and an inlet that is spatially communicated with the heating space. The discharge unit is disposed at an end of the reaction tube opposite to the inlet, and has a discharge space spatially communicated with the heating space, an observation window spatially communicated with the discharge space oppositely of the heating space, and a discharge opening spatially communicated with the discharge space. The cooling unit is connected to the discharge unit and has a cooling space spatially communicated with the discharge opening. The feeding unit includes a carrier adapted for holding the sample, a moving module, and a support rod connected between the carrier and the moving module. The moving module is operable to move the carrier and the support rod, such that the sample held on the carrier is movable to the heating space and thereafter to the discharge space to be discharged from the carrier into the cooling space through the discharge opening. The observation and analysis unit includes an image capture module adapted for capturing image of the sample through the observation window, and an analysis module mounted to the reaction tube and spatially communicated with the heating space for analyzing gas released by the sample heated in the heating space.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
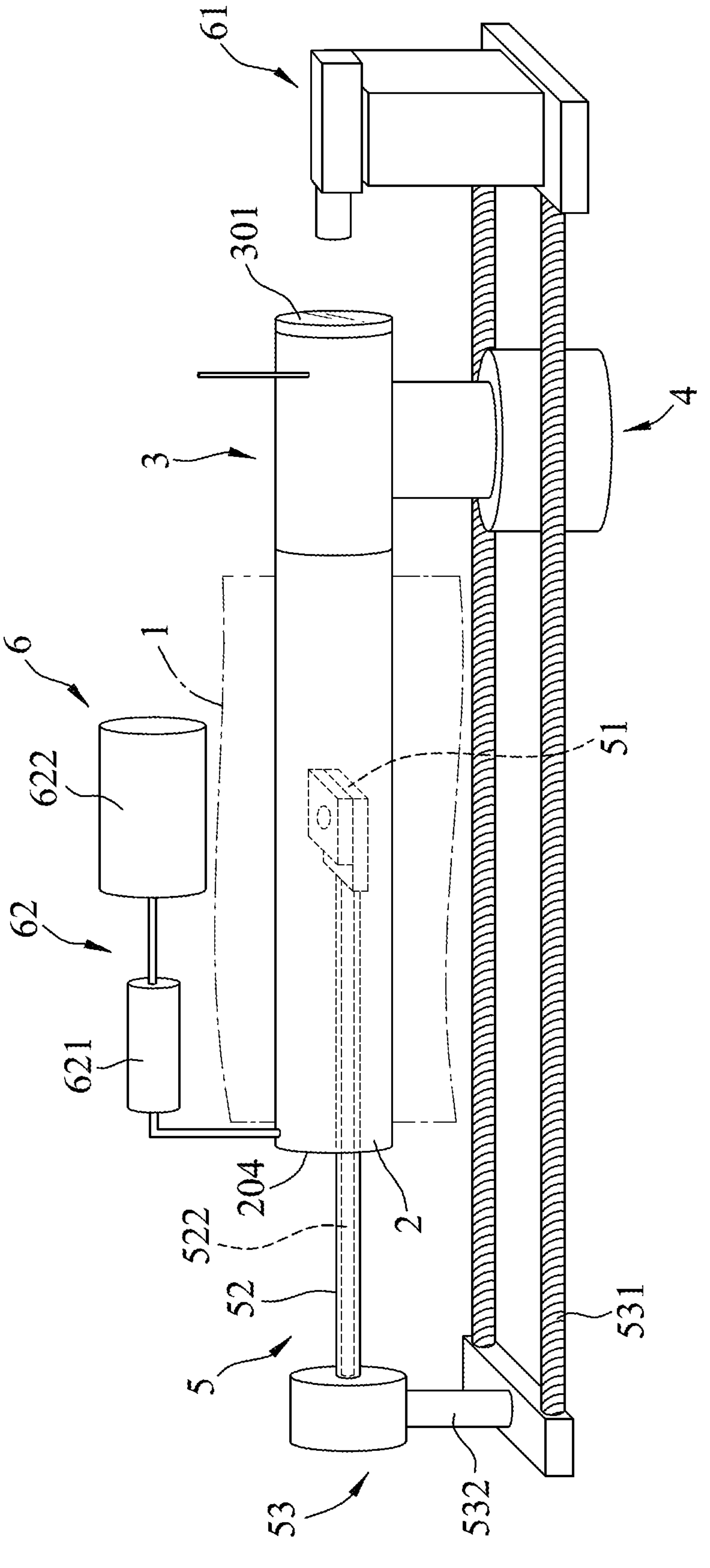
FIG. 1 is a schematic perspective view of an embodiment of a high temperature reaction system according to the present disclosure.
Figure 2:
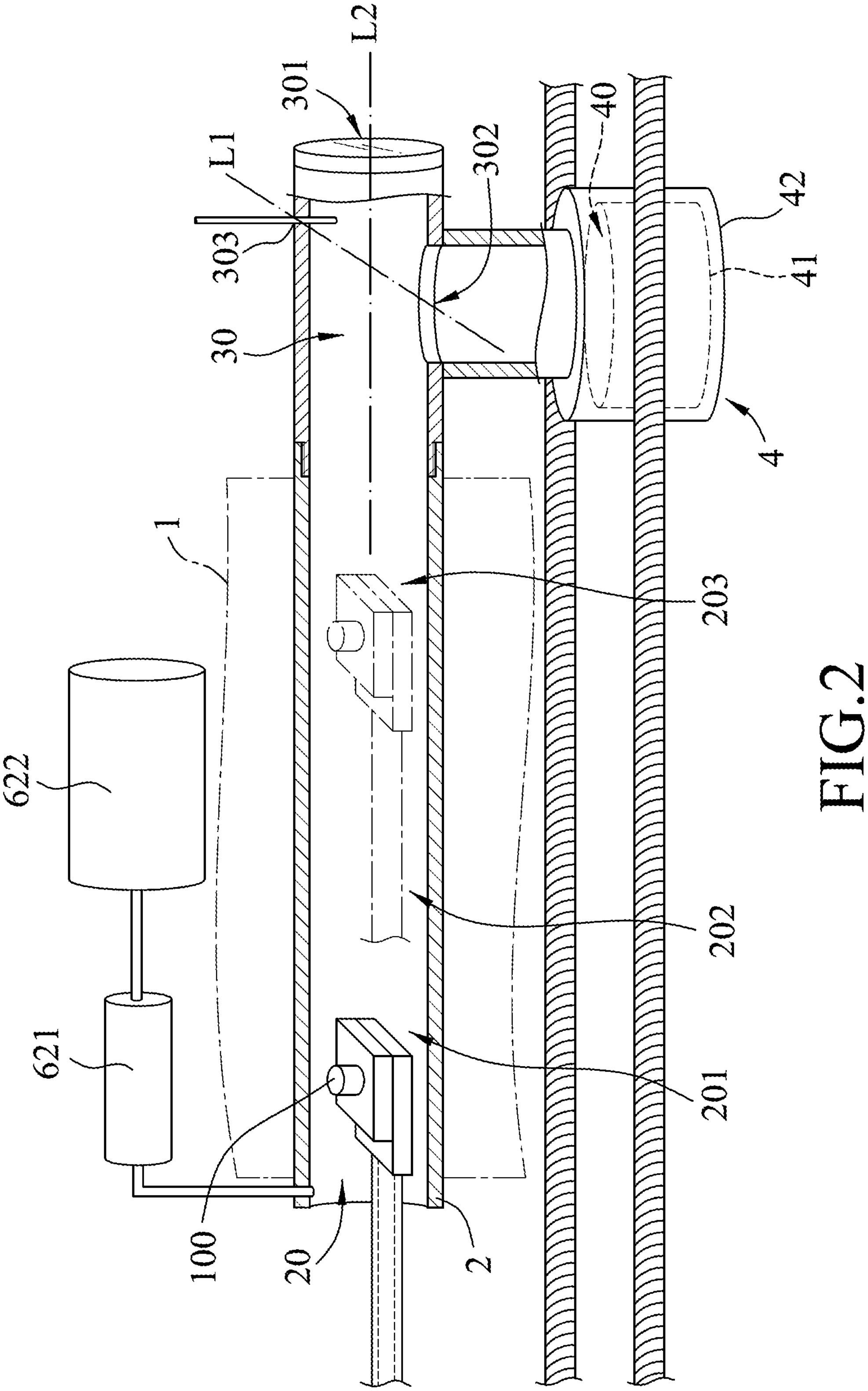
FIG. 2 is a schematic, fragmentary sectional view of the embodiment.
Figure 3:
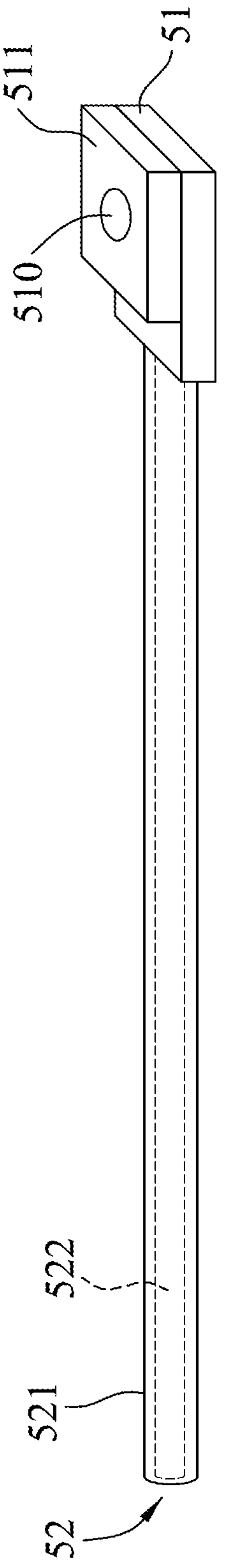
FIG. 3 is a schematic perspective view of a carrier and a support rod of a feeding unit of this embodiment.

Referring to FIGS. 1 to 3, an embodiment of a high temperature reaction system according to the present disclosure is capable of performing an in situ analysis of a sample 100 during heat treatment. In this embodiment, the high temperature reaction system includes a reaction tube 2, a discharge unit 3, a cooling unit 4, a feeding unit 5 and an observation and analysis unit 6.

The reaction tube 2 is partially surrounded by a high temperature furnace 1, and includes a heating space 20 and an inlet 204 that is spatially communicated with the heating space 20. In this embodiment, the heating space 20 has a heating portion 202 that is adapted to be heated by the high temperature furnace 1, a preheating portion 201 that is spatially communicated between the inlet 204 and the heating portion 202, and a cooling portion 203 that is spatially communicated with the heating portion 202 opposite to the preheating portion 201. The reaction tube 2 is made of a high-temperature resistant material, and has a uniform and rapid thermal conducting property. In practical application, the sample 100 may be preheated in the preheating portion 201, heated in the heating portion 202, and cooled in the cooling portion 203. The temperature of the sample 100 can therefore be increased and decreased by placing the sample at different portions of the heating space 20.

The discharge unit 3 is disposed at an end of the reaction tube 2 opposite to the inlet 204, and has a discharge space 30 spatially communicated with the cooling portion 203 of the reaction tube 2, an observation window 301 spatially communicated with the discharge space 30, a discharge opening 302 spatially communicated with the discharge space 30, and a gas inlet opening 303 formed in the reaction tube 2 opposite to the discharge opening 302 and spatially communicated with the discharge space 30. In this embodiment, the observation window 301 and the cooling portion 203 are disposed respectively at two opposite sides of the discharge space 30 and the cooling portion 203 is disposed between the heating portion 202 and the discharge space 30. The discharge opening 302 and the gas inlet opening 303 are disposed respectively at upper and lower sides of the discharge space 30. As shown in FIG. 2, an imaginary line (L1) connecting the discharge opening 302 and the gas inlet opening 303 intersects an imaginary line (L2) connecting the cooling portion 203 and the observation window 301. It should be noted that the arrangement of the discharge opening 302 and the gas inlet opening 303 may be varied according to other embodiments.

The cooling unit 4 is connected to the discharge unit 3 and has a cooling space 40 that is spatially communicated with the discharge opening 302 of the discharge unit 3. In this embodiment, the cooling unit 4 includes an inner wall 41 that defines the cooling space 40, and an outer wall 42 that surrounds and is spaced apart from the inner wall 41. Based on practical requirements, the cooling space 40 may be filled with a liquid with different temperatures for cooling the sample 100, such as a high temperature liquid that is slightly cooler than the sample 100, a room temperature liquid or a low temperature liquid. The double layer (i.e., the combination of the inner wall 41 and the outer wall 42) design of the cooling unit 4 can prevent the cooling unit 4 from breaking or cracking during a cooling process.

The feeding unit 5 includes a carrier 51 adapted for holding the sample 100, a moving module 53, and a support rod 52 connected between the carrier 51 and the moving module 53. The moving module 53 is operable to move the carrier 51 and the support rod 52, such that the sample 100 held on the carrier 51 is movable to the heating space 20 to be heated by the high temperature furnace 1 and is movable to the discharge space 30 to be discharged from the carrier 51 into the cooling space 40 through the discharge opening 302.

The carrier 51 includes a substrate 511 that defines a limiting space 510 adapted for receiving the sample 100. In this embodiment, the limiting space 510 has a rounded hole for receiving a round sample 100. However, according to other embodiments, the shape of the limiting space 510 may be cubic or rectangular for receiving a cubic or rectangular sample 100. The support rod 52 includes a hollow tube body 521, and a thermocouple 522 that is disposed in the hollow tube body 521 and that is connected to the carrier 51 for measuring the temperature of the sample 100 held on the carrier 51. Because the thermocouple 522 is connected to the carrier 51, it can be used for instantaneously monitoring the temperature of the sample 100 held on the carrier 51 during thermal treatment. The substrate 511 and the hollow tube body 521 may be made of aluminum oxide with high purity, which is capable of withstanding high temperature during the thermal treatment.

The moving module 53 includes a rail 531 that is disposed outside of the reaction tube 2 and that extends along the reaction tube 2, a moving member 532 that is movably mounted to the rail 531, and a driver (not shown). An end of the support rod 52 opposite to the carrier 51 is connected to the moving member 532. The moving member 532 is capable of being driven by the driver to move along the rail 531 so that the sample 100 is moved in the reaction tube 2. In this embodiment, the rail 531 is exemplified as being a ballscrew, and the driver is exemplified as being a motor. However, they are not intended to be limited so.

The observation and analysis unit 6 includes an image capture module 61 that is adapted for capturing image of the sample 100 through the observation window 301, and an analysis module 62 that is mounted to the reaction tube 2 and that is spatially communicated with the heating space 20 for analyzing gas released by the sample 100 heated in the heating space 20. The analysis module 62 includes a cold trap 621 that is spatially communicated with the heating space 20, and a gas analyzer 622 that is connected to the cold trap 621 and that analyzes the gas released by the sample 100. The image capture module 61 and the moving member 532 are respectively located at two opposite end portions of the rail 531, and the reaction tube 2, the discharge unit 3 and the cooling unit 4 are disposed between the image capture module 61 and the moving member 532. The image capture module 61 is movably disposed on the rail 531 opposite to the moving member 532. Therefore, when the moving member 532 moves the carrier 51 in the heating space 20, the image capture module 61 can be simultaneously moved so as to be maintained at a proper focus distance from the sample 100.

In operation of the high temperature reaction system, the reaction tube 2 is first heated to a desirable temperature using the high temperature furnace 1, and the sample 100 is placed into the limiting space 510 of the carrier 51. Then, the thermocouple 522 is inserted into the hollow tube body 521 and is connected to the carrier 51, and the support rod 52 is connected to the moving member 532, which is operable to move the sample 100 to one of the preheating portion 201, the heating portion 202 and the cooling portion 203 of the heating space 20 according to the process requirement. When the sample 100 is moved to the heating portion 202, the thermocouple 522 cooperates with a temperature control device (not shown) to determine the temperature of the sample 100. It should be noted that the driver may be controlled manually or automatically.

When the sample 100 is being heated in the heating space 20, the analysis module 62 is operable to analyze the gas released by the sample 100. Specifically, the cold trap 621 removes liquid or solid particles entrained by the gas, and then the gas analyzer 622 analyzes composition of the gas, such as the amounts or flow rates of carbon monoxide, carbon dioxide, and hydrogen in the gas. A carrier gas may be introduced into the heating space 20 of the reaction tube 2 through the gas inlet opening 303 to prevent backflow of the gas from the analysis module 62 to the heating space 20.

Figure 4:
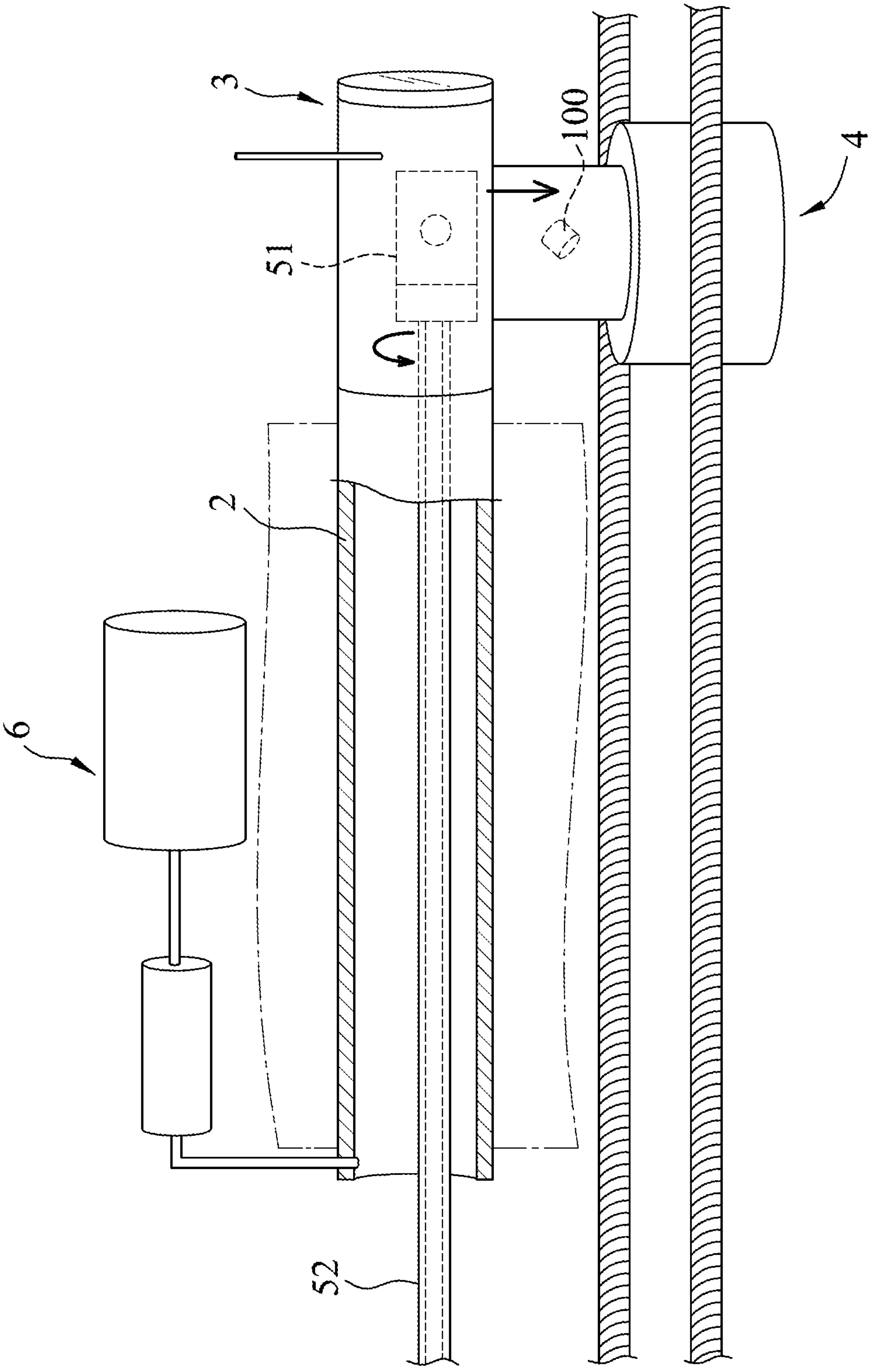
FIG. 4 is a schematic, fragmentary sectional view of the embodiment, showing a sample being released from the carrier to a cooling unit of this embodiment.

Referring further to FIG. 4, after heat treatment of the sample 100 in the heating portion 202 of the heating space 20 is complete, the carrier 51 is moved into the discharge space 30 of the discharge unit 3, such that the sample 100 is located above the discharge opening 302. Then, the moving member 532 is operated to rotate the support rod 52 and the carrier 51 in order to allow the sample 100 to drop into the cooling space 40 of the cooling unit 4 through the discharge opening 302 to undergo a cooling process in the cooling space 40.

To sum up, the high temperature reaction system according to the present disclosure is capable of performing thermal treatment, image capturing, gas analysis and temperature monitoring at the same time. With the heating space 20 of the reaction tube 2 being divided into the preheating portion 201, the heating portion 202 and the cooling portion 203, the sample 100 can be moved by the moving member 532 from one of the aforesaid portions to the other portion to increase or decrease the sample's temperature, thereby facilitating control of the sample's temperature, as well as a temperature-increasing rate thereof. The unique design of the discharge unit 3 allows the sample 100 to be cooled in the cooling unit 4 immediately after heating of the sample 100 in the heating space 20, thereby preventing the sample 100 from undesirably continuing its reaction after being heated in the heating space 20.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A high temperature reaction system capable of performing an in situ analysis of a sample during heat treatment, said high temperature reaction system comprising:

a reaction tube that includes a heating space having a heating portion, and an inlet that is spatially communicated with said heating space;

a discharge unit that is disposed at an end of said reaction tube opposite to said inlet, and that has a discharge space spatially communicated with said heating space, an observation window spatially communicated with said discharge space oppositely of said heating space, and a discharge opening spatially communicated with said discharge space;

a cooling unit that is connected to said discharge unit and that has a cooling space spatially communicated with said discharge opening;

a feeding unit that includes a carrier adapted for holding the sample, a moving module, and a support rod connected between said carrier and said moving module, said moving module being operable to move said carrier and said support rod, such that the sample held on said carrier is movable to said heating space and thereafter to said discharge space to be discharged from said carrier into said cooling space through said discharge opening; and an observation and analysis unit that includes an image capture module adapted for capturing image of the sample through said observation window, and an analysis module mounted to said reaction tube and spatially communicated with said heating space for analyzing gas released by the sample heated in said heating space.

2. The high temperature reaction system as claimed in claim 1, wherein said heating space further has a cooling portion that is spatially communicated between said heating portion and said discharge space, and a preheating portion that is spatially communicated with said heating portion opposite to said cooling portion.

3. The high temperature reaction system as claimed in claim 1, wherein:

said moving module includes a rail that is disposed outside of said reaction tube and that extends along said reaction tube, and a moving member that is movably mounted to said rail;

an end of said support rod opposite to said carrier is connected to said moving member; and said moving member is movable along said rail to move the sample in said reaction tube.

4. The high temperature reaction system as claimed in claim 3, wherein said image capture module and said moving member are respectively located at two opposite sides of said rail, and said reaction tube, said discharge unit and said cooling unit are disposed between said image capture module and said moving member.

5. The high temperature reaction system as claimed in claim 1, wherein said analysis module includes a cold trap that is spatially communicated with said heating space, and a gas analyzer that is connected to said cold trap.

6. The high temperature reaction system as claimed in claim 1, wherein said cooling unit includes an inner wall that defines said cooling space, and an outer wall that surrounds and is spaced apart from said inner wall.

7. The high temperature reaction system as claimed in claim 1, wherein said discharge unit further has a gas inlet opening that is formed in said reaction tube opposite to said discharge opening and that is spatially communicated with said discharge space.

8. The high temperature reaction system as claimed in claim 7, wherein said observation window is disposed in an end face of said end of said reaction tube, said discharge space is disposed between said cooling portion of said heating space and said observation window and between said gas inlet opening and said discharge opening, an imaginary line connecting said discharge opening and said gas inlet opening intersecting an imaginary line connecting said cooling portion and said observation window.

9. The high temperature reaction system as claimed in claim 1, wherein said support rod includes a hollow tube body, and a thermocouple that is disposed in said hollow tube body and that is connected to said carrier for measuring temperature of the sample held on said carrier.

10. The high temperature reaction system as claimed in claim 1, wherein said carrier includes a substrate that defines a limiting space adapted for receiving the sample.

* * * * *